B. D. CHAMBERLIN.
APPARATUS FOR THE MANUFACTURE OF BLOWN GLASS ARTICLES.
APPLICATION FILED SEPT. 16, 1915. RENEWED DEC. 4, 1916.
1,256,979.
Patented Feb. 19, 1918.
5 SHEETS—SHEET 1.
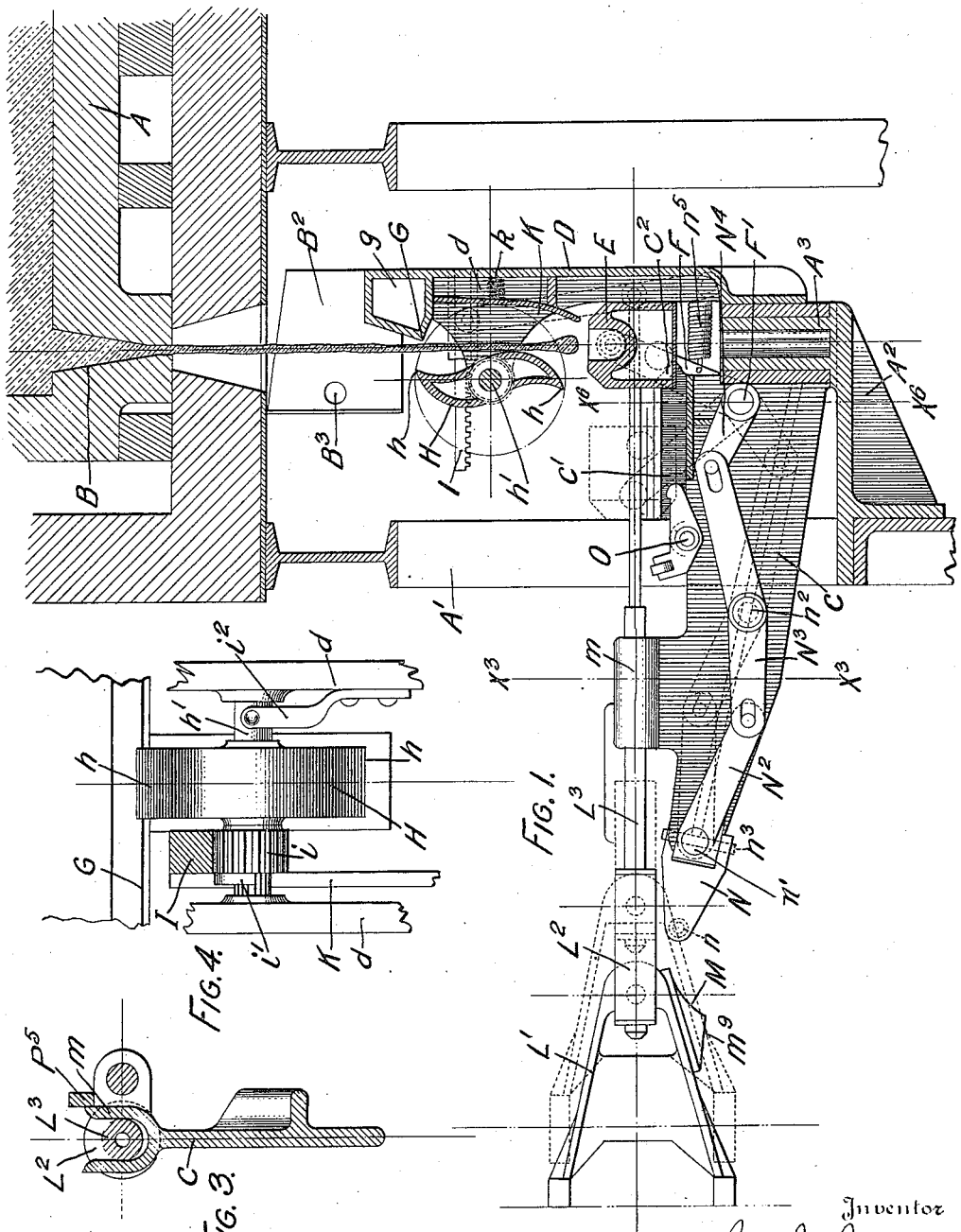

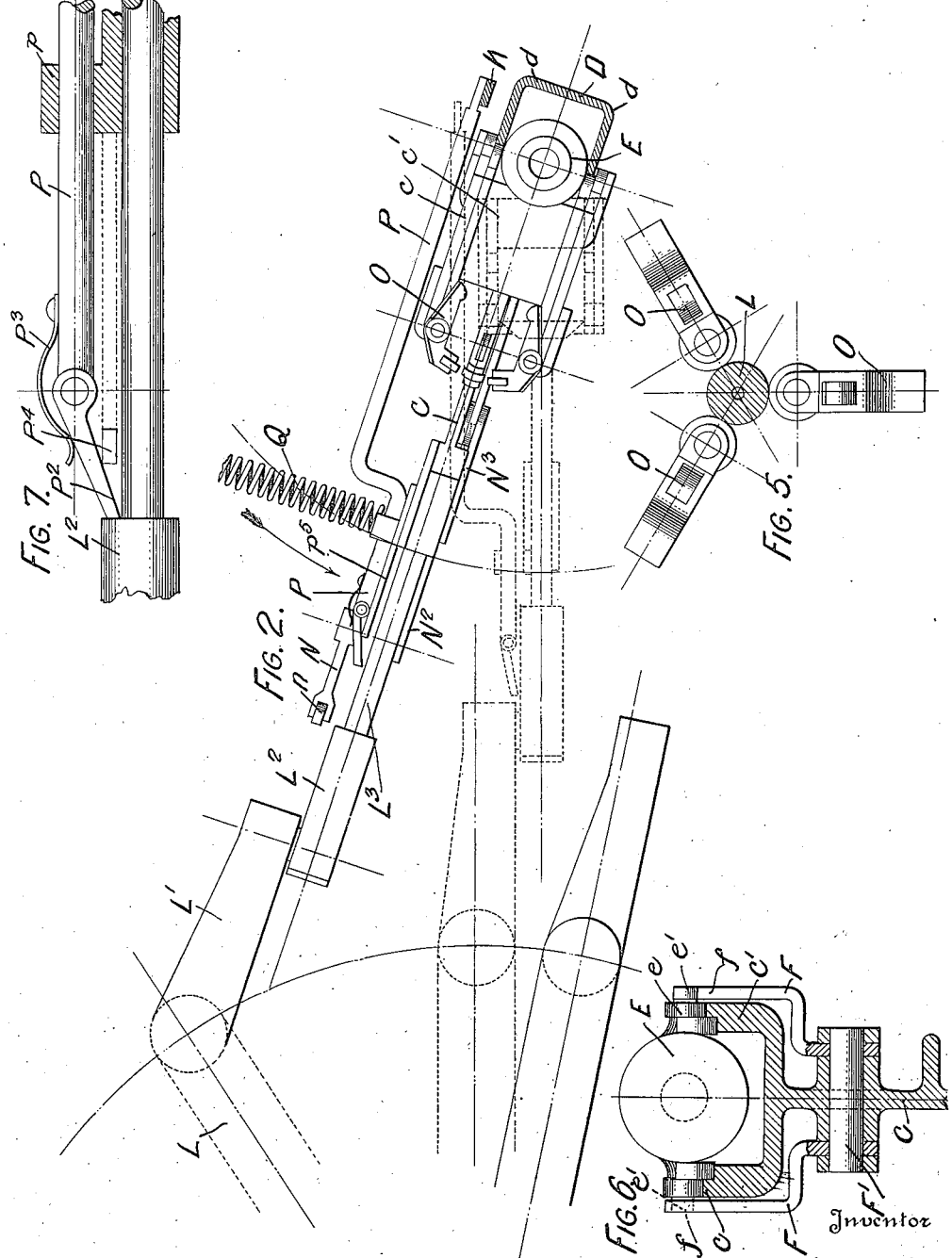

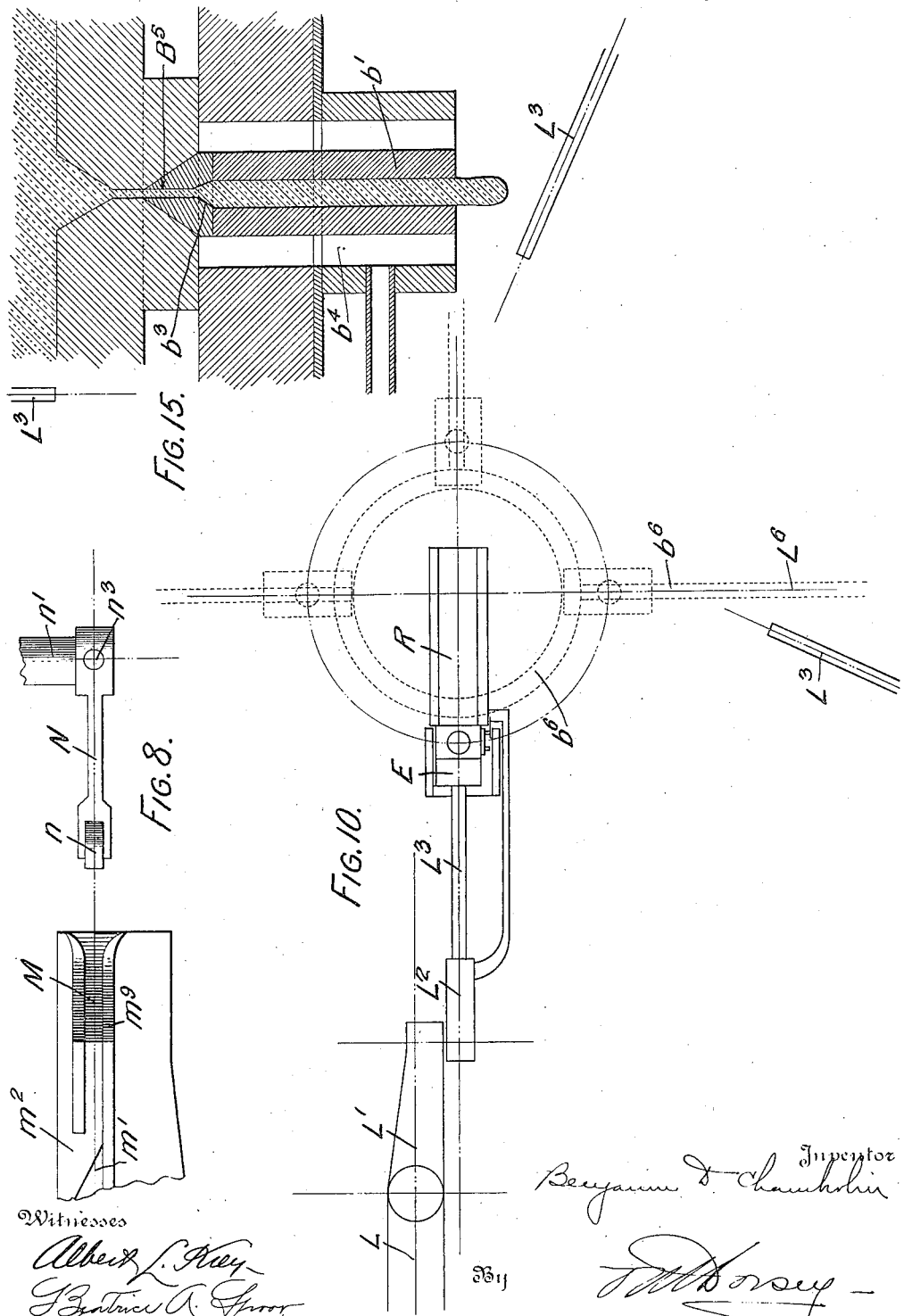

B. D. CHAMBERLIN.
APPARATUS FOR THE MANUFACTURE OF BLOWN GLASS ARTICLES.
APPLICATION FILED SEPT. 16, 1915. RENEWED DEC. 4, 1916.
1,256,979.
Patented Feb. 19, 1918.
5 SHEETS—SHEET 4.
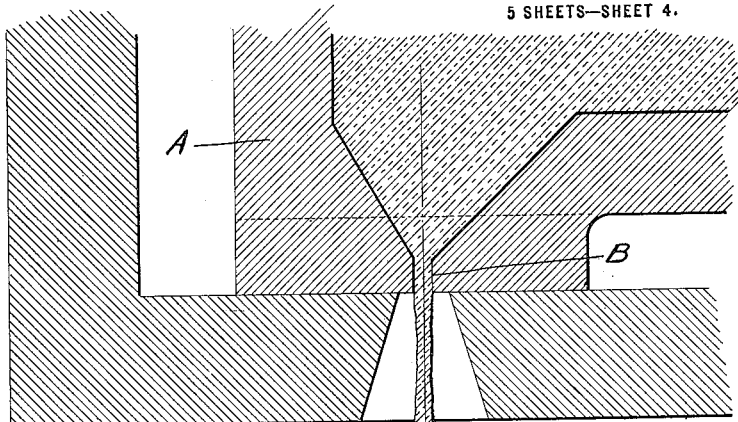
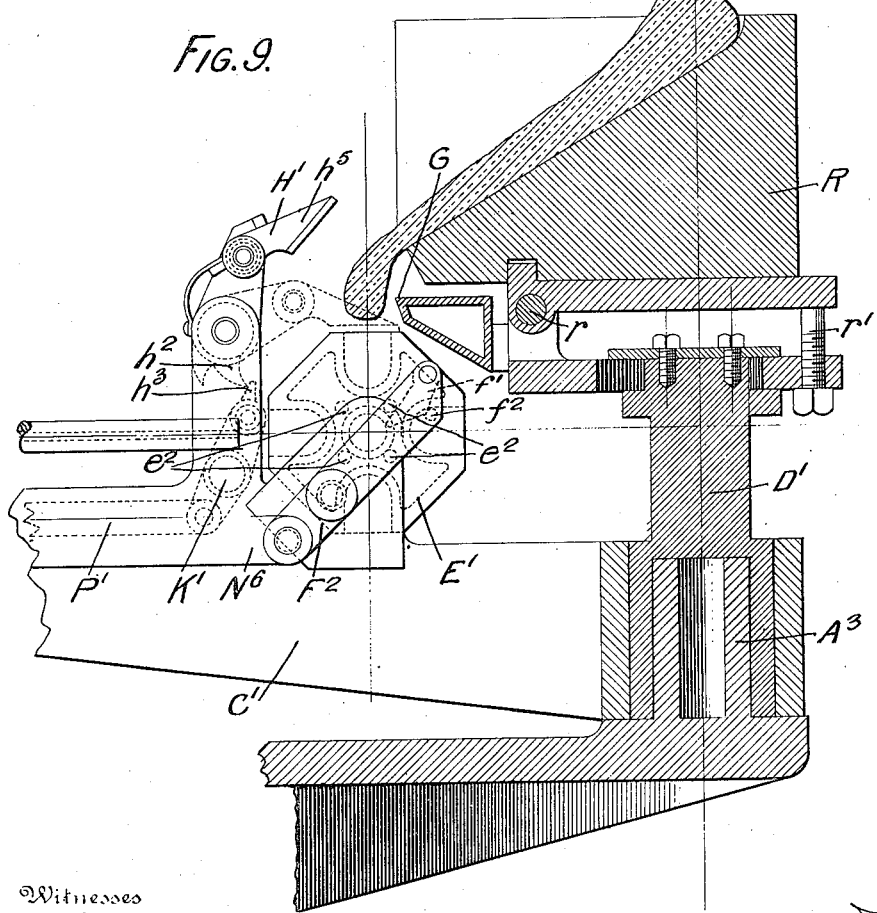
FIG. 9.

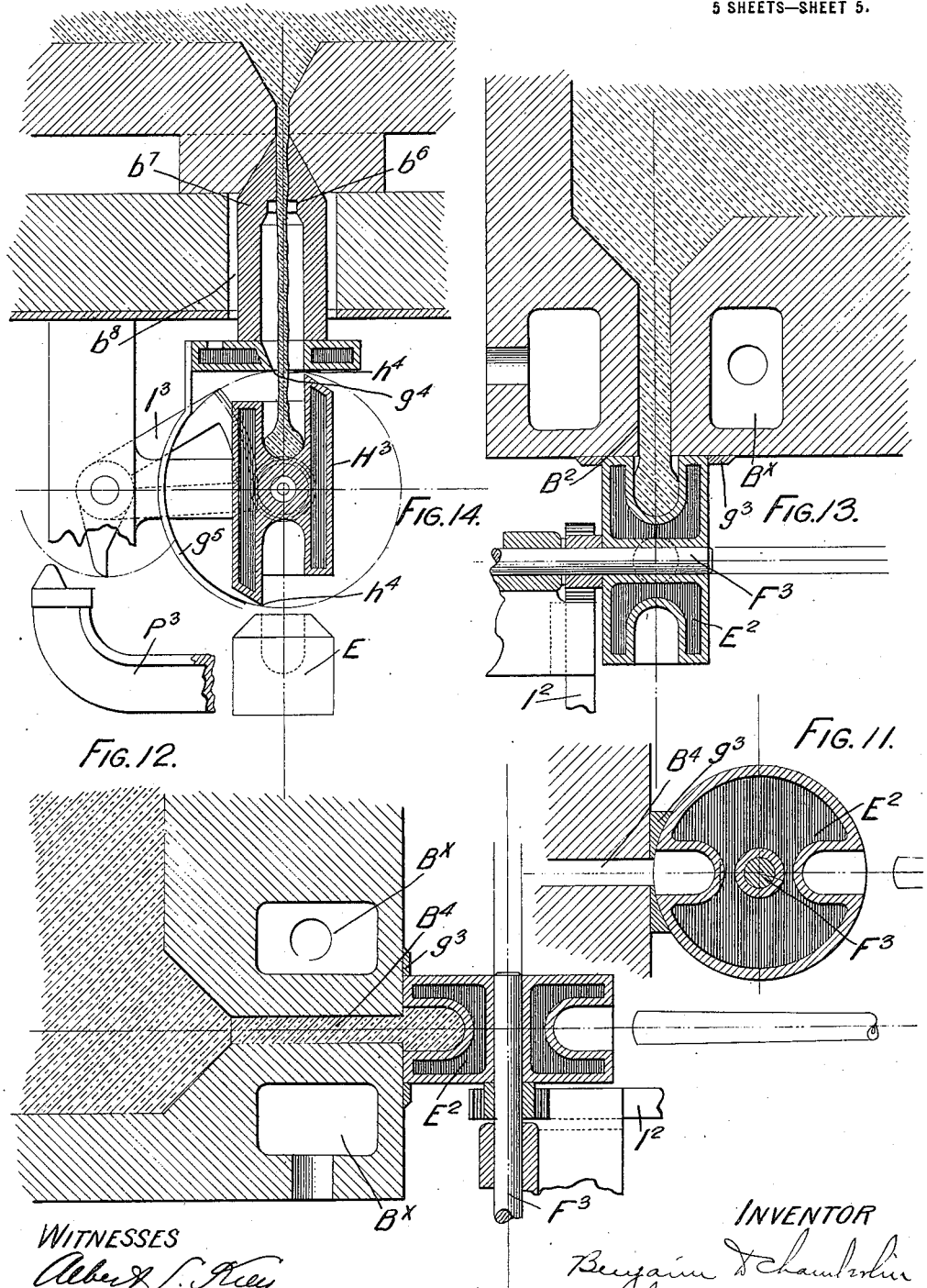

UNITED STATES PATENT OFFICE.

BENJAMIN DAY CHAMBERLIN, OF ROCHESTER, NEW YORK, ASSIGNOR TO EMPIRE MACHINE COMPANY, OF PORTLAND, MAINE, A CORPORATION OF MAINE.

APPARATUS FOR THE MANUFACTURE OF BLOWN-GLASS ARTICLES.

1,256,979.  Specification of Letters Patent.  Patented Feb. 19, 1918.

Original application filed June 2, 1911, Serial No. 630,944. Divided and this application filed September 16, 1915, Serial No. 51,031. Renewed December 4, 1916. Serial No. 135,006.

*To all whom it may concern:*

Be it known that I, BENJAMIN D. CHAMBERLIN, a citizen of the United States of America, and a resident of Rochester, New York, have invented certain new and useful Improvements in Apparatus for the Manufacture of Blown-Glass Articles of which the following is a specification.

In the manufacture of blown glass articles on the blow-pipe the practice heretofore generally employed has been for a workman to insert the blow-pipe in the molten glass in the furnace and to manipulate it in such a manner as to gather thereon sufficient glass for a "gather," and the blow-pipe with the glass has been removed from the furnace and the "gather" shaped by marvering preparatory to blowing in the mold. This process is comparatively slow due to the time consumed in effecting a proper gather, and in marvering.

My present invention has for its object to retain the blowing on the blow-pipe with its advantages but to dispense with the delays which have attended working in the way before described, and this I accomplish by forming suitably shaped blanks of glass, and affixing the same to the blow-pipes, the blanks being properly formed to dispense with the marvering, and after a proper period for elongation and cooling or heating, if necessary, the blanks are blown in a mold. The mechanism to carry out the above process is capable of numerous modifications and embodiments and I have in this application shown several forms of devices capable of coaction with a form of blowing machine shown in my other application filed March 23, 1910, Serial No. 551,198.

This application is filed as a division of my prior application, Serial Number 630,944, filed June 2, 1911, in response to demands of the United States Patent Office, and the claims hereof are restricted to the apparatus invented by me. Claims upon the process shown herein are reserved for my said original application.

The several features constituting my invention will be further pointed out in the claims which will follow this description.

Referring to the accompanying drawings in which corresponding parts are designated by corresponding marks of reference:—

Figure 1 is an elevation partly in section of a machine embodying one form of my invention.

Fig. 2 is a plan view thereof showing in full and dotted lines two positions of the parts.

Fig. 3 is a section on line $x^3$—$x^3$ of Fig. 1.

Fig. 4 is a front elevation of the cutter mechanism.

Fig. 5 is a detached end view of the blow-pipe guides.

Fig. 6 is a transverse section on lines $x^6$—$x^6$ of Fig. 1, with the casting mold in the position to receive the blow-pipe.

Fig. 7 is a detail sectional view of the cutter actuating mechanism.

Fig. 8 is an inverted view of the mold actuating cam.

Fig. 9 is a diagrammatic view partly in section illustrating another form of my invention.

Fig. 10 is a diagrammatic plan showing a single severing and molding device coöperating with and surrounded by a plurality of blowing machines.

Fig. 11 is a sectional view representing another form of my invention in which the blank molding and severing mechanism are combined.

Fig. 12 is a fragmental horizontal section of the device shown in Fig. 11.

Fig. 13 is an embodiment of a structure somewhat similar to Fig. 11 but with a bottom delivery furnace instead of a side delivery furnace.

Fig. 14 is a fragmental view of another embodiment of my invention.

Fig. 15 is a view of another form of my exit orifice.

Referring to the form of mechanism shown in Figs. 1 to 8, the furnace A is supported above the floor of the workroom by a suitable framing A', and is provided with an exit aperture B in its bottom through which the molten glass may flow in a continuous stream during the working periods.

A bracket A² supported on the framing A' has a vertical pintle A³ located beneath the exit aperture B of the furnace, and upon the pintle is mounted the mechanism for severing the stream of glass and forming it into blanks of the desired size and shape. The supporting frame for this mechanism comprises a radially extending arm C and a standard D rigidly connected together to oscillate upon the pintle through a limited arc.

A mold E has its trunnion $e'$ mounted in slots $f$ in the upper end of arms F fixed to the cross shafts F' journaled in the web of the radially extending arm, and the shaft is, by mechanism to be hereinafter described, capable of having angular motion imparted to it for the purpose of swinging the mold from the position shown in full lines in Fig. 1, in which its mold cavity is uppermost and beneath the exit orifice of the furnace, to the position shown in dotted lines in said figure, in which the mold cavity faces outwardly. In the latter position the mold is steadied and held by horizontal faces $c$ on the bifurcated top $c'$ of the arm C, which faces receive rollers $e$ mounted upon the sides of the mold. The tilting of the mold in swinging from one position to another is further assured by the beveling of the inner end of that face $c$ which engages the lower roller $e$, as is shown at $c^2$, Fig. 1.

Located above the mold is the severing mechanism, comprising a cutting edge G formed upon the upper end of the standard D and which may be cooled or heated as desired by circulating a proper medium through the cavity $g$ in the head of the structure immediately adjacent thereto, and the blades $h$, located at diametrically opposites sides of the rotary knife H, which is also hollow to permit the circulation of temperature controlling medium through it. This knife is mounted upon the horizontal shaft $h'$ carried in the side web $d$ of the standard D and is driven by the reciprocating rack I which engages a pinion $i$ loose upon the shaft but adapted to be clutched therewith for the purpose of driving the shaft in the cutting direction by means of a pawl and ratchet $i'$. The rack is reciprocated in a direction to cause a cutting motion of the blade by means of its articulation to the upper end of a link K pivoted at the base of the standard D and is thrown back to its normal position by means of a spring $k$. To prevent backward movement of the cutting blade, due to the friction of the parts, a spring $i^2$ may be affixed to the standard and bear upon squared or otherwise suitably shaped faces of the shaft $h'$ which will also tend to arrest the knife in the position shown in Fig. 1, after it has completed its cutting motion. It will be noticed that the knife with its two diametrical cutting edges is so shaped that the descending stream of glass does not contact therewith when the knife is in normal position and that in cutting the only point of contact between the glass and knife is at the cutting edge. This is important in preventing the heating of the knife and the improper cooling of the descending glass.

The above constitutes the mechanism by which the glass is cut and the severed gob glass molded in blanks of proper form and the blank mold positioned horizontally. Such mechanism is especially adapted for use in connection with a blowing machine of the type shown in my other application Serial No. 551,198 before referred to. In that application, a blowing machine is described adapted to support a plurality of blow-pipes and to manipulate them in a certain predetermined way. Among the manipulations of the blow-pipe which are thus performed are the projection of the blow-pipe in a substantially horizontal position into a furnace, the dipping of the blow-pipe to effect a gather and its withdrawal from the furnace, a marvering of the gather and a vertical positioning of the blow-pipe for elongating and molding. Inasmuch as the gathering and marvering may be no longer essential with the type of machine herein shown in which the blank is cast to proper form, such functions of my prior machine may be suppressed and the movement by which the blow-pipe is horizontally projected into the furnace mouth in such prior application be utilized to cause the fixing of the blank to the blow-pipe. As stated in my prior application the movements of the blow-pipe through a vertical arc are governed by a cam plate so that by a variation in the shaping of such cam, the dipping motion of the blow-pipe and the swinging of the blow-pipe for marvering may be readily suppressed.

I have in Figs. 1 and 2 shown, in outline, the machine of my prior application. For the present purpose it is sufficient to state that the machine comprises a rotary head plate L carrying a plurality of frames L' pivoted thereto, with mechanism for oscillating such frames through a limited arc around a vertical pivot, whereby such frames may be caused to assume positions of greater or less inclination in respect to the radii of the traveling head at the extremities of which they may be pivoted; blow-pipe supports L² pivoted in the free ends of the frames and mechanism whereby such supports may be rotated around a horizontal axis in respect to such frames, whereby in addition to the translatory motion of the blow-pipes as a whole around the center of rotation of the head plate, each blow-pipe may be moved horizontally through a limited arc around the pivotal connection between its frame L' and the head frame and in a limited arc in a vertical plane around the connection between its support and its frame L'. The blowing mechanism is not shown in these figures as the same is of the construction previously disclosed and as far as concerns the present invention may be modified in any desired way.

For the purpose of coördinating the movements of the blowing machine and of the cutting and molding machine herein described in such a way that the severed and molded blank contained in the casting mold will be stuck upon the end of the blow-pipe carried upon the blowing machine, I have devised the following mechanism.

As stated the cutting and molding mechanism is mounted to oscillate upon the pintle A³ and is normally at that limit of its movement which is shown in full lines in Fig. 2, that is to say, it is thrown rearwardly in respect to the translatory movement of the coöperating blow-pipes carried in the blowing machine, the direction of movement of which is indicated by the arrow in the same figure, it being understood that the blowing machine is fixedly located at such distance from the center of movement of the cutting and molding mechanism as will permit the proper functioning of the mechanism to be hereinafter described.

The parts being in the position stated a blow-pipe L³ carried by the blowing machine is, by its movements, brought over guides $m$ formed by a bifurcation on the top of the arm C, and is lowered into such bifurcation, whereby during the period that such engagement subsists the blowing machine will be connected to the cutting and molding mechanism. The continued rotation of the rotary head L will move the pivot of the blow-pipe frame from the position shown in full lines to that shown in dotted lines in Fig. 2, and in so doing the frame L' will swing upon its pivot to assume a radial position in respect to the rotary head, and the arm of the severing and molding mechanism will be swung thereby through an arc to assume a position parallel with the blow-pipe. During this movement, due to the fact that the parts are approaching the line joining the axes of movement of the rotary head and of the severing and molding mechanism, the blow-pipe will be projected toward the axis upon which the severing and molding mechanism swings.

Upon the lower side of each blow-pipe frame L' of the blowing machine is placed a cam M, with which an anti-friction roller $n$ carried upon the outer end of an arm N upon the end of a shaft $n'$ mounted in the outer end of the arm C is adapted to run when such frame is projected toward the cutting mechanism. The opposite end of the shaft $n'$ has an oppositely extending arm N², which is articulated to one end of a lever N³ pivated at $n^2$ in the arm C, the opposite end of the lever N³ being articulated to an arm N⁴ fast upon the molding and cutting shaft F' whereby, when in the movement of the parts, the blow-pipe carrying frame L' approaches the line joining the axes of the two elements, the arm N is depressed and through the system of movements before described the mold will be shifted from its vertical to its horizontal position, being at the same time projected outwardly toward the approaching blow-pipe, which is in alinement therewith, so that the glass contained in the cavity of the mold will be forced upon the end of such blow-pipe. The continued movement of the blowing machine will then cause the roller $n$ to pass the highest point $m^9$ of the cam M, and will permit a slight movement of the mold to correspond with the continued slight advance of the blow-pipe due to the swing of the latter upon its several pivotal mountings. The severed and formed blank is by this mechanism struck upon the end of the blow-pipe and while further movement of the traveling frame past the dotted position of Fig. 2 will cause a recession of the parts and permit the blow-pipe to withdraw the blank fastened thereto out of the mold cavity, it may be desirable to provide for the rapid removal of the mold away from the blank affixed as aforesaid to the blow-pipe, in order to prevent the cooling of the blank or the heating of the mold. For this purpose the arm N is not rigid upon the shaft $n'$ but is mounted thereon by a diametrical pivot $n^3$ so that it has a lateral motion. A lateral cam $m'$ is fixed in the guide run formed on the cam M, and the wall of the run is cut away at $m^2$ whereby at the desired time the end of the arm N is shifted laterally to disengage the roller $n$ from the mold tipping cam M, whereby the control of the latter over the former will be destroyed and the mold returned to normal position by the spring $n^5$.

For the purpose of properly positioning the blow-pipe axially in respect to the mold cavity in the sticking position, a plurality of jaws O are pivoted on the web of the arm C around the axis of the blow-pipe when in such position, the outer ends of such arms carrying anti-friction rollers, and their inner ends being normally in the path of the mold when projected outwardly and being adapted to be struck thereby for the purpose of causing the forward ends to close upon the blow-pipe when the mold is projected outwardly, thereby steadying the blow-pipe.

The severing mechanism is likewise actuated from the blowing machine and the device for effecting this consists of a rod P having its rearward end connected with the lever K of the severing mechanism and its forward end guided in a bearing $p$ adjacent to the blow-pipe receiving slot $m$. Beyond such bearing $p$ the rod P has pivoted thereto a spring-pressed finger $P^2$ pressed by a spring $P^3$ toward the blow-pipe and against an abutment $P^4$ carried by the arm $p^5$ from the blow-pipe receiving guide $m$. Upon the engagement of the blow-pipe in the guide the end of the finger $P^2$ is engaged by the end of the blow-pipe support and the movement of the latter toward the center of rotation of the severing mechanism projects the rod P inwardly in the direction of the arrow in Fig. 7, thus actuating the severing mechanism. After a stroke of the rod P, determined by the adjustment of the abutment $P^4$, the latter will, due to the motion of the finger $P^2$ relative thereto, force the latter away from the blow-pipe and free the finger $P^2$ from the blow-pipe support, thus permitting the spring $k$ to return the knife-actuating rack I to initial position.

By the mechanism above described is provided a severing and molding device and a coöperating continuously moving blow-pipe supporting mechanism with coördinating devices whereby the movement of the blow-pipe supporting mechanism will actuate the severing and molding mechanism to sever and mold a charge and to cause movement of the severing and molding mechanism to accommodate the continuously moving blow-pipes, and whereby the molded blank will be stuck upon the end of the blow-pipe. After the operations above referred to the blow-pipes will be lifted out of the guiding bifurcation $m$ into the radial arm of the molding mechanism and will be given such movements in the blowing machine as are necessary for completion of the article, thus releasing the severing and molding mechanism which may then be returned to its initial position by any appropriate device, such as a spring Q.

In order to control the temperature of the issuing stream of glass before it is severed it is desirable to inclose the same in a shield $B^2$ which may be provided with means, such as the pipe $B^3$, for introducing heating or cooling media as may be desired, for instance, such as a blast of gaseous fuel.

In Fig. 9 I have shown another form of severing and molding mechanism in which in lieu of a single mold cavity present in the mold of the previous structure, a plurality of mold cavities are present and the mold is rotated on its horizontal axis through an arc of 90° for presenting a filled cavity to the blow-pipe. In this figure moreover the severing mechanism is provided with means for compressing the glass in the blank mold. The furnace A is of the structure previously described and beneath the exit orifice B thereof is an inclined trough R carried upon the standard D' which is mounted on the pintle $A^3$. Surrounding the standard and rigidly attached thereto is the hub of the radial arm C', the axis of the pintle being as before beneath the exit orifice. Mounted in a bifurcation upon the arm C' is the shaft of the blank mold E' which is shown as provided with four mold cavities, diametrically opposite each other, the axis of the mold being situated below and in front of the lower lip or end of the trough R and in such position that the upper mold cavity will receive the glass flowing from the latter. Four pins $e^2$ are spaced equidistant upon one end of the mold and are adapted to be engaged by a click $f'$ mounted upon the free end of a crank arm $F^2$ pivoted to the mold bracket, and whose opposite end is articulated to the lever $N^6$, so that upon the inward movement of the latter the click will engage one of the pins $e^2$ and turn the mold through an arc of 90°, the click then freeing itself from the mold due to the respective centers of movement. The arm $N^6$ may be actuated by mechanism similar to the mold turning mechanism of Figs. 1 to 8. Pivoted in a projection upon the arm C' in front of the mold bracket is the combined cutter and presser H' whose tail $h^2$ is adapted to be engaged by a pawl $h^3$ carried upon the lever K' when the latter is actuated by a rod P' to bring the cutter past the fixed knife edge G located beneath the trough. The cutter consists of two parts namely the tail portion $h^2$ which is pivoted in a projection upon the arm C' and the presser and cutter portion $h^5$ which is pivoted to the tail portion $h^2$, and is spring-pressed thereon, so that upon the actuation of the rod P', (which may be effected from the blowing machine in the same manner as the rod P of Figs. 1 to 8 is actuated,) the cutter and presser not only sever the stream flowing from the trough but the presser $h^5$ will press the severed glass into the mold cavity, which will then be turned through an arc of 90° to receive the incoming blow-pipe.

As a means for permitting regulation of the distribution of the glass at the cutting point, I prefer to make the trough R adjustable in inclination, this being accomplished by pivotally mounting its forward end as at r, and providing an adjusting screw r' at its rear end.

The severing and molding mechanisms of the character above described are not limited in application to serving a single blowing machine but where a great economy of structure and maximum output is desired, one severing and pressing mechanism may supply a plurality of blowing machines as is illustrated in Fig. 10 in which the severing and pressing mechanism is located concentrically of four blowing machines, the whole being connected together by gearing $b^6$ to move in unison and the construction being such that each machine projects its blow-pipe toward the center of the severing mechanism in succession, and the severing mechanism is rotated at such speed as to present a filled mold to the blow-pipe of each machine in succession. It will be seen in the construction shown in Fig. 10 that as the glass in one mold cavity is being stuck upon the blow-pipe the succeeding mold cavity is being filled. Hence the severing and molding mechanism of this type has a sufficiently rapid rate of production to supply the four blowing machines in succession. I prefer, as shown, to cause the rotation of the blowing machines and of the severing and molding mechanism upon its axis, by the same motor whereby a proper coördination of the blowing machines with each other and with the angular movement of the severing and molded mechanism is obtained, and to actuate the glass severing mechanism and the mold moving mechanism from the blow-pipe frame of the blow-pipe with which it has a coöperative relation, as thereby a proper timing of these essential features is secured.

In Figs. 11 and 12 the exit orifice $B^4$ is located in the side of the furnace slightly above the bottom thereof and is surrounded by heating passages $B^x$ by which the temperature in the orifice may be controlled. The wall of the furnace immediately at the end of the orifice is provided with a concaved face plate $g^3$ against which works a rotary recessed combined gate and mold $E^2$ mounted on a vertical shaft $F^3$ and the latter is given angular movement by the rack $I^2$ actuated from the blowing machine in the manner before described so that a filled mold cavity will be removed from opposite the exit orifice $B^4$ of the furnace and presented to the incoming blow-pipe, the rotation of the combined gate and mold cutting the stream of glass at the exit orifice itself. The face plate $g^3$ serves also to scrape from the periphery of the gate mold any glass that may be spread thereon.

In Fig. 13 the structure is the same as that shown in Figs. 11 and 12 except that the exit orifice $B^4$ is in the bottom of the furnace instead of on the side, and the mold gate is mounted on a horizontal instead of a vertical axis, and instead of rotating through an arc of 180° between the loading of each mold cavity and the placing of the charge therein on the blow-pipe rotate through an arc of 90° only, that is to say, the mold that is filled is the upper one and the blow-pipe is inserted in that mold when the latter comes horizontal as is the case in the structure of the mold of Fig. 9.

In all of the several forms of the invention before described, the severed glass is presented to the blow-pipe by the receptacle in which it is contained immediately after severing and hence in all these forms the end of the blank which is severed in each operation of the machine is the end of the blank which receives the blow-pipe and this will be naturally the hotter one, and in all of them the opposite end is shaped by contact with the mold cavity and forms the bottom of the article.

In Fig. 14 I have shown a different type of apparatus. In this figure a knife structure $H^3$, comprising two diametrical reception cavities, each having a cutting edge $n$ adjacent to one side thereof is mounted below the exit orifice and is adapted to be intermittently rotated through an arc of 180° by a rack sector $I^3$ driven by the rod $P^3$ which may be actuated if desired in the same manner the rod P is operated in Figs. 1 to 8, the rack sector being capable of returning to initial position without backward motion of the cutter structure in the same manner as is the rack I of Fig. 1. The cutting edges $h^4$ coöperate with the water-cooled knife $g^4$ located adjacent to the exit orifice of the furnace, and I provide a shield $g^5$ to prevent the throwing of the contents of the receptacles as the latter are rotated. One of the receptacles of such a cutter structure having been filled by the stream of glass from the furnace, the cutter structure is rotated through an arc of 180° and the glass contained therein is dropped into a casting mold E which may be of the construction shown in Figs. 1, 2, 6, 8 and 9, and by this mold is presented to the blow-pipe. It will be noted that in this embodiment of my invention the severed glass is inverted end for end so that each blank has that end which was the first severed presented to the blow-pipe and the end which was last severed left free to form the bottom of the article to be blown.

In several forms of my invention which I have shown, the relative sizes of the stream of glass to the finished blank is different.

In Figs. 11, 12 and 13, the blank is practically formed from a mass of molten glass by segregating as it were a part of the contents of the furnace. In Fig. 9 the cross sectional area of the stream flowing down the trough R may be adjusted by the inclination of the latter and made equal to the cross section of the finished blank.

In Figs. 1 and 14 the stream of glass has not the same cross sectional area as the mold and hence the blank may have a different character from that formed by the severing of a stream of proper cross section.

In Fig. 15 I have shown another device by which the area of the stream may be controlled, this consisting of a gradual enlargement of the exit orifice of the furnace whereby the cross sectional area of the stream of glass is increased without increasing the rate of flow from the furnace. As shown in this figure, the exit orifice $B^5$ of restricted size connects with a discharge tube $b'$, of greater area, the junction being effected by a tapering section $b^3$ located immediately at the end of the orifice as I consider it important for the finer grades of work that the stream of glass be given practically the cross section of the blank before the temperature of the glass has been so far lowered as to cause flow marks. To insure the spreading and formation of a solid stream in Fig. 15 the tube $b'$ is surrounded by a temperature controlling space $b^4$ provided with means for introducing media into such chamber for the purpose of lowering the temperature thereof and thus chilling the flowing glass into a stream whose cross section is that of the blank.

In Fig. 14 I have also provided the exit orifice with a tube $b^7$ contained in a temperature controlled space $b^8$ but in this figure the orifice proper terminates in a square wall $b^6$ so that there is no tendency of the glass in passing out of the orifice to flow down the walls of the tube and produce a stream of increased cross section as in Fig. 15. The temperature controlled space is, however, in this construction important in that the exit orifice may be closed from time to time by a suitable plug inserted in the tube and it is necessary that means be provided to heat the tube in order to prevent the freezing of the glass at that point when shut off and to permit it to be readily opened when congealed.

It is obvious that the form of exit orifice shown in Fig. 15 can if desired be used in lieu of that shown in Fig. 1 and that in such case the "blank" will be cast from a stream of glass having approximately the same cross section as the blank.

What I claim is:—

1. In a machine for the manufacture of blown glass articles, the combination with a receptacle for molten glass having a discharge orifice, of a constantly traveling blank mold and a constantly traveling blow-pipe, means for positioning the mold to receive the discharge from the orifice and to register with the blow-pipe, and means for causing a relative approaching movement of the mold and blow-pipe in the last named position of the mold.

2. In an apparatus for the manufacture of blown glass articles, the combination with a receptacle for containing fluid glass, and having a discharge orifice, of a mold, means for casting in the mold from the discharge from the said orifice blanks of proper sections, and means for projecting a blow-pipe against the blank to cause it to adhere thereto, and for removing the blow-pipe with the blank thereon away from the mold.

3. In a machine for the production of blown glass articles, the combination with a receptacle for molten glass having a discharge orifice, of a blank mold open at one end only, a blow-pipe, means for positioning the mold to fill the same through its opening by a discharge from the said orifice, and means for causing a relative movement of the mold and blow-pipe, whereby the blow-pipe will be projected against the blank at the open end of the mold.

4. The combination with a blank-forming mechanism, of a series of traveling glass-forming devices co-acting therewith, and having a movement to and from the blank-forming mechanism, whereby the glass-forming devices are caused to enter the blank-forming mechanism and to and from each other.

5. The combination with a container for molten glass, means for constantly feeding a stream of glass therefrom of definite diameter, means for severing such stream of glass into portions, a mold of substantially the same diameter as the stream of glass adapted to receive the severed portions thereof, and having one end only of its mold cavity open, and a blow-pipe, and means for projecting the same within the open end of the mold, and against the glass therein.

6. The combination with a glass-furnace having a flowing orifice, of a plurality of glass-forming machines arranged around such orifice and each comprising a finishing mold and a reciprocating member adapted to be projected into position to receive the glass after its issue from the said furnace and to deliver it to the finishing mold.

7. The combination with a glass furnace having a flowing orifice, of means for severing the glass issuing from such orifice into charges, and a plurality of glass-forming machines each comprising a finishing mold and a reciprocating member adapted to receive the glass when severed, and to transfer it to the finishing mold.

8. The combination with a glass-furnace having a flowing orifice, of a plurality of rotary glass-forming machines each comprising a plurality of molds, and a plurality of reciprocating elements, each reciprocating element in the rotation of its machine being adapted to take glass issuing from the said orifice and to deliver it to its appropriate mold.

9. The combination with a glass-furnace having a flowing orifice, of a receiving mold, an inclined glass transfer trough adapted to receive glass from the said orifice and deliver it to the said mold, and means for varying the inclination of the said trough, whereby the diameter of the stream of glass flowing therefrom may be varied.

10. The combination with a glass-furnace having a flowing orifice, of an inclined transfer trough arranged below the orifice and adapted to receive glass therefrom, a mechanism severing the glass flowing from the said trough into charges, and means for varying the inclination of the said trough and thereby varying the diameter of the glass at the severing point.

In testimony whereof I have signed my name.

BENJAMIN DAY CHAMBERLIN.